United States Patent

Kaneda et al.

[11] Patent Number: 6,137,653
[45] Date of Patent: Oct. 24, 2000

[54] RELEASE MECHANISM FOR A REEL BRAKE MEMBER FOR A TAPE CASSETTE

[75] Inventors: Hiroshi Kaneda, Nagano-ken; Masatoshi Okamura; Akio Momoi, both of Saku; Kenji Hashizume, Miyota-machi, all of Japan

[73] Assignee: TDK Corporation, Tokyo, Japan

[21] Appl. No.: 09/122,925

[22] Filed: Jul. 27, 1998

[30] Foreign Application Priority Data

Aug. 1, 1997 [JP] Japan .................................. 9-219789
Dec. 29, 1997 [JP] Japan .................................. 9-369651

[51] Int. Cl.[7] .............................................. G11B 23/087
[52] U.S. Cl. ...................................... 360/132; 242/343.2
[58] Field of Search ........................... 360/132; 242/347, 242/347.1, 343.2, 338.3

[56] References Cited

U.S. PATENT DOCUMENTS

| | | | |
|---|---|---|---|
| 4,225,100 | 9/1980 | Sugawara | 242/338.2 |
| 4,553,717 | 11/1985 | Takagi | 242/338.3 |
| 4,802,048 | 1/1989 | Perkins et al. | 242/343 |
| 4,918,558 | 4/1990 | Igarashi et al. | 360/132 |
| 5,212,614 | 5/1993 | Hughes et al. | 360/133 |
| 5,398,147 | 3/1995 | Johanson | 360/132 |
| 5,505,397 | 4/1996 | Goff et al. | 242/338.3 |
| 5,544,834 | 8/1996 | Esguerra et al. | 242/347.1 |
| 5,576,917 | 11/1996 | Shimokuni | 360/132 |

FOREIGN PATENT DOCUMENTS 4-67267  6/1992  Japan .

Primary Examiner—Brian E. Miller
Attorney, Agent, or Firm—Marshall, O'Toole, Gerstein, Murray & Borun

[57] ABSTRACT

When a guide wall formed in the lower casing of a tape cassette housing for guiding a brake release member is extended upward into the upper casing, the corresponding part of the upper casing must be cut off to provide a recess. The recess, located in the central part of the upper casing, reduces the structural strength of the upper casing. Also there are problems of deformation of the cassette wall parts subject to the urging of the spring member and development of a gap between the mating edges of the upper and lower casings during storage at elevated temperature. The present invention is directed to the solution of the problems.

In a tape cassette which includes a housing comprised of upper and lower casings, a pair of tape reels turnably held in the housing, and a brake mechanism comprising reel brake members and a brake release member all of which are located in the front part of the housing and between the pair of tape reels, in an arrangement such that, when the cassette is not in use, the brake members are urged by a spring member in directions where they are in mesh with serrated flange peripheries of the reels and, when the cassette is used, the release member is forced upward against the spring force by a brake release pin and the brake members cooperatively swing out of mesh with the serrated flange peripheries of the reels, setting the tape reels free to turn; a guide wall for guiding the release member for upward and downward movement is formed in one piece with the lower casing, with the upper part of the guide wall being overlapped with a corresponding part of the upper casing. A solid joint part for securing the upper and lower casings together is provided in the vicinity of the region where the release lever moves upward and downward along the front wall.

8 Claims, 17 Drawing Sheets

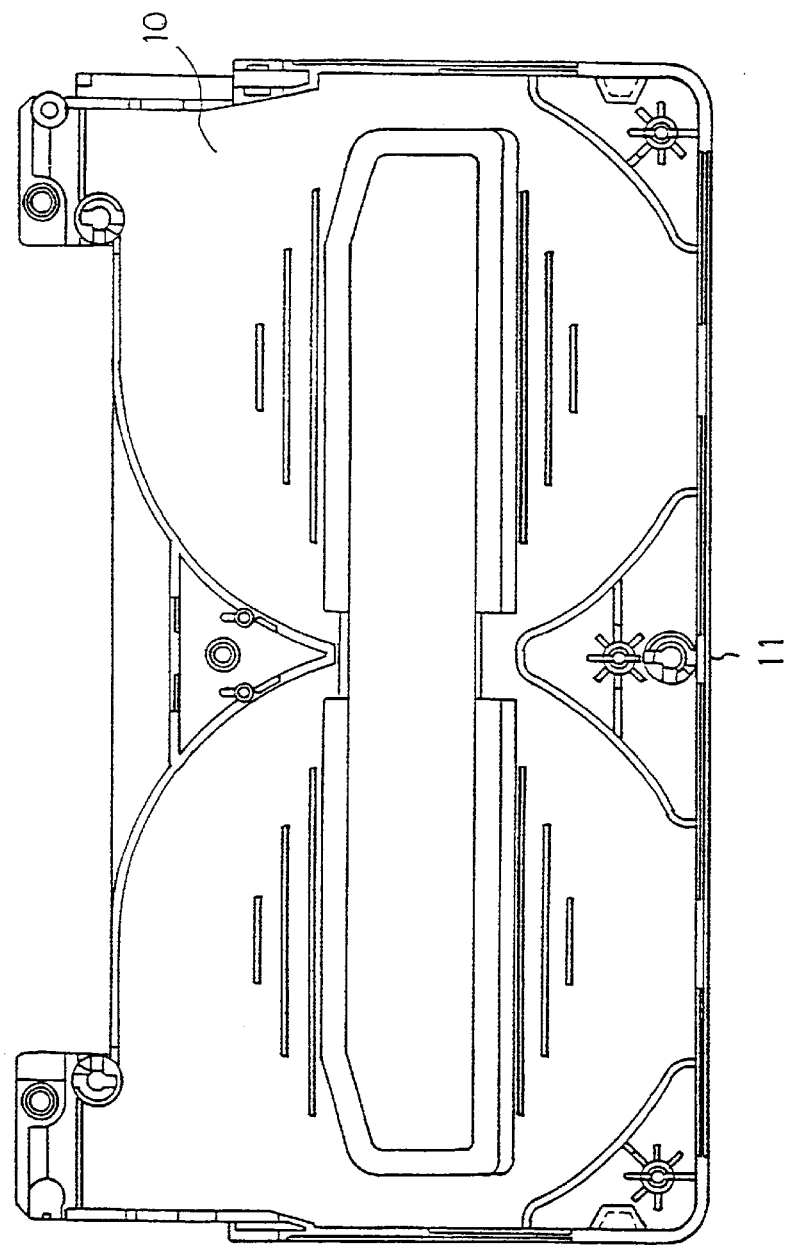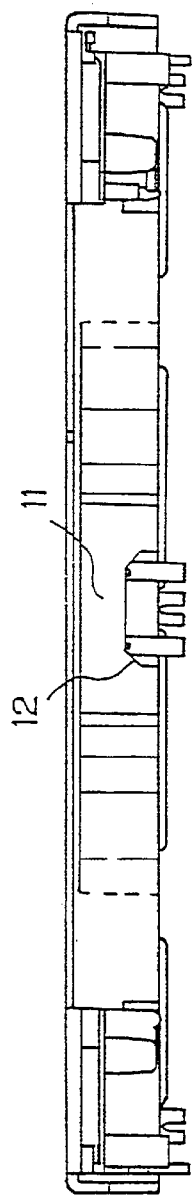
Fig. 5(a)
Fig. 5(b)

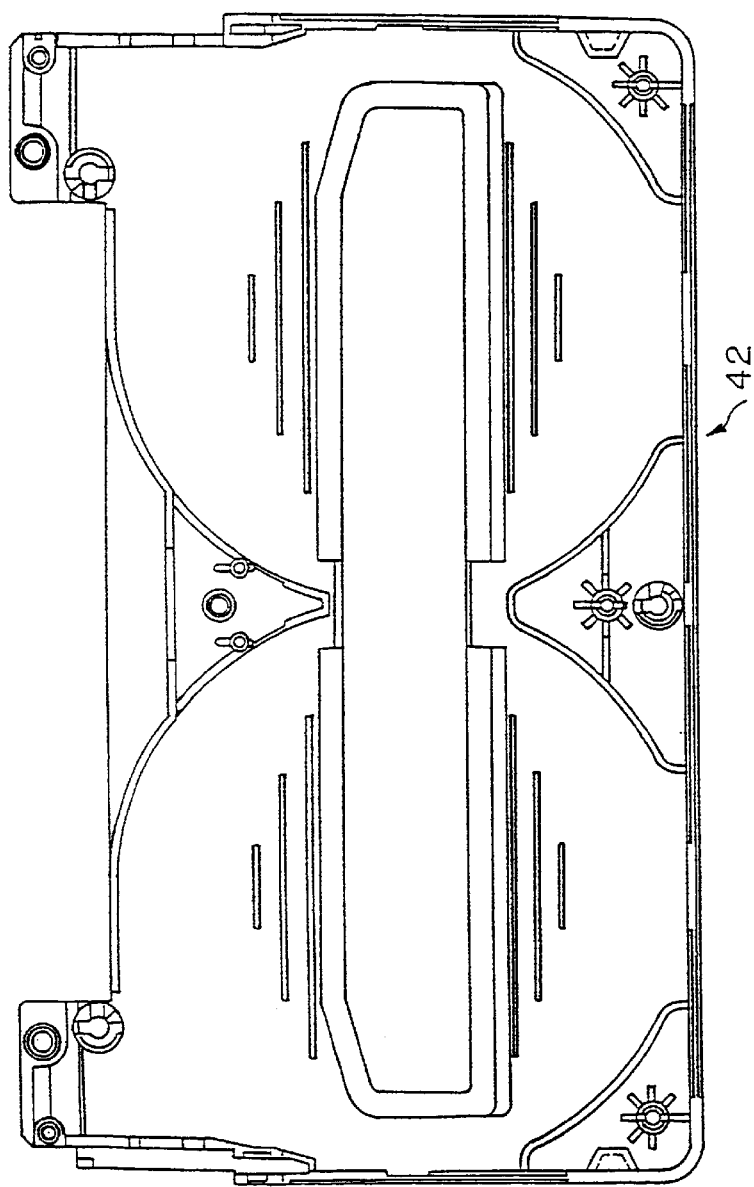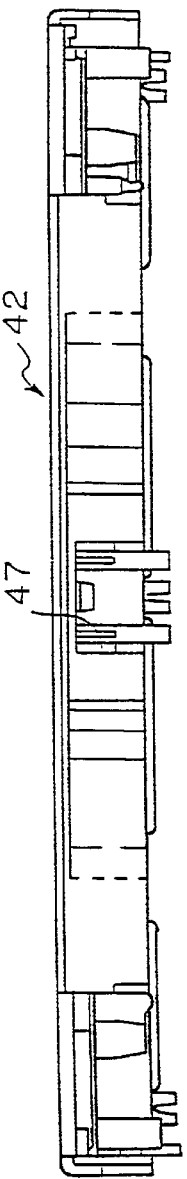
Fig. 9(a) Prior Art
Fig. 9(b) Prior Art

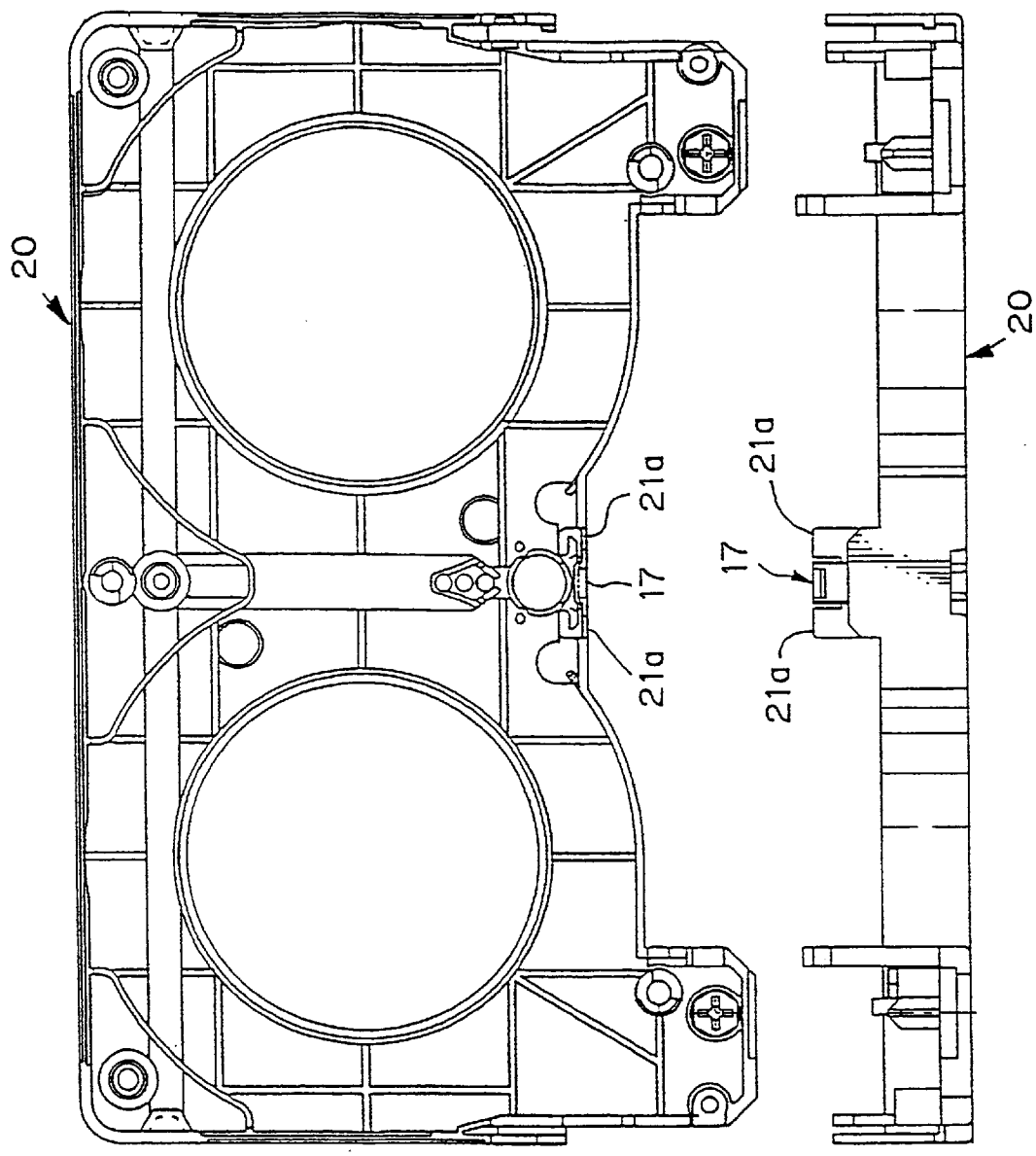

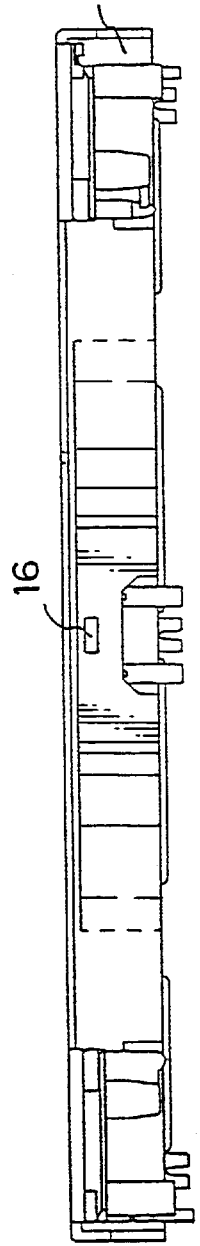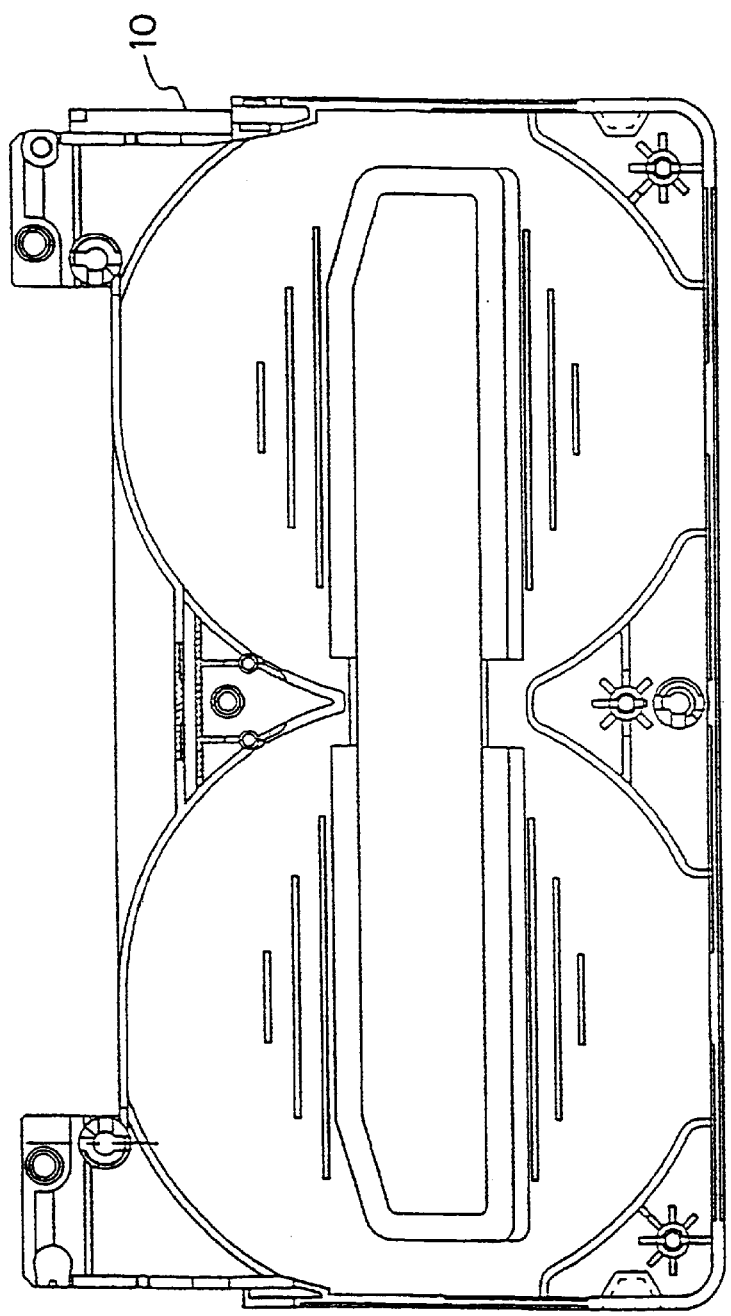
Fig. 19(a)
Fig. 19(b)

RELEASE MECHANISM FOR A REEL BRAKE MEMBER FOR A TAPE CASSETTE

BACKGROUND OF THE INVENTION

1. Field of the Invention

This invention relates to a tape cassette, such as a video tape cassette, in which a magnetic tape is wound around reels to magnetically record and reproduce electric signals, and more specifically to a tape cassette equipped with a reel brake mechanism.

2. Prior Art

With tape cassettes having a pair of reels around which a length of tape is wound, it is common to provide a pair of brake members which are kept in contact with the reels to prevent its turning lest the magnetic tape should loosen when it is not in use (in storage). When the tape is used the brake members are released to allow free turning of the reels.

Utility Model Application Kokai No. 4-67267 proposes a design which enables a pair of brake members and the related mechanism to occupy only a limited space of a cassette housing. According to the design, a pair of pivotally supported brake members are pressed at one end by springs against serrated peripheries of the reels and, as the release pin of the cassette recorder forces a brake release member upward in the space between the upper and lower casings, the upward motion is transmitted through a cam face to the opposite ends of the brake members so as to unlock them.

In that case a vertical member for guiding the brake release member is formed on the lower casing. As FIGS. 8 and 9 illustrate, the lower casing 40 has guide grooves for the release member formed on a guide wall 41 which also serves as a front wall of the casing, between guide ribs 43, 43 immediately inside of the guide wall 41, and between internal guide members 45, 45. The guide member that guides the brake release member (refer to 8 in FIG. 1) inside the upper casing is thus formed by extending the guide wall 41 of the lower casing into the upper casing 42. The corresponding part of the upper casing 42 is formed with an opening 47.

The part of the upper casing corresponding to the guide wall 41 formed on the lower casing is cut open to provide the opening 47. The opening 47, located in the center of the upper casing 42, makes the upper casing structurally weak.

The inner wall of the upper casing is under constant stress by the spring member (refer to 9 in FIG. 1) that urges the brake release member downward). This can cause bulging of the central part of the upper casing when the cassette is in use at elevated temperature, thereby marring its reliability.

In a tape cassette of the construction described above, the space for holding the brake members is limited because of the structural design of the cassette. There is no room, therefore, to fix the upper and lower casings together with screws in the region where the both casings are constantly under tension by the spring member that normally applies pressure to a brake release lever. Tapping screws are used only in the regions distant from the brake members, i.e., at the front and rear corners and in the center of the rear side.

As described above, the spring member that presses the release lever downward inside the cassette housing also constantly applies upward pressure to the upper casing. This can lead to deformation of the upper casing, causing deviation of the thickness dimension of the cassette out of the specified, standard range or development of a gap between the mating edges at the front of the upper and lower casings, when the temperature at which the cassette is transported or stored is elevated depending on the environment, such as the season of the year or the location as the inside of an automobile.

SUMMARY OF THE INVENTION

The present invention provides a tape cassette including a housing comprised of upper and lower casings, a pair of tape reels turnably held in the housing, and a brake mechanism comprising reel brake members and a brake release member all of which are located in the front part of the housing and between the pair of tape reels, in an arrangement such that, when the cassette is not in use, said brake members are urged by a spring member in directions where they are in mesh with serrated flange peripheries of the reels and, when the cassette is used, said release member is forced upward against the spring force by a brake release pin and said brake members cooperatively swing out of mesh with said serrated flange peripheries of the reels, setting the tape reels free to turn, characterized in that a guide wall for guiding said release member for upward and downward movement is formed in one piece with the lower casing, with the upper part of the guide wall being overlapped with a corresponding part of the upper casing.

Preferably, the overlap wall part of the upper casing is made lower than the adjoining parts and is recessed, with the corners of the recess being beveled or curved.

In the tape cassette of the invention, the wall for guiding the release member is formed in one casing as before, and ensures good release action. The upper part of the guide wall for the release member is composed of wall parts of the upper and lower casings lying one over the other. Since the upper casing is not cut off deep, the strength and heat resistance of the upper casing are kept unimpaired. Both the guide wall of the lower casing and the corresponding part of the upper case are beveled for added strength.

In another aspect of the invention, in order to solve these problems, a tape cassette is provided including a housing comprised of upper and lower casings, a pair of tape reels around which a length of tape is wound and which is turnably held in the housing, brake members for controlling the turning of the reels, a brake release lever which is moved upward and downward by a release pin of a device when the tape cassette is loaded therein, and a spring member normally urging the release lever downward, said release lever being adapted to move upward and downward along the front wall of the housing to move the brake members accordingly, said upper and lower casings being joined together with screws at four corners, characterized in that a solid joint part for securing the upper and lower casings together is provided in the vicinity of the region where the release lever moves upward and downward along the front wall.

According to the present invention the upper and lower casings are joined together at a solid joint part in the vicinity of a brake release lever. The solid joint part takes up and supports the action of a spring member that normally urges the release lever for reel brake members in the braking directions. This prevents changes in the thickness of the cassette or formation of a gap between the mating edges of the upper and lower housings and permits the cassette to maintain good performance, even in high temperature environments such as the inside of an automobile.

The solid joint part for the upper and lower casings according to the invention may be varied in structure.

The solid joint part in one embodiment of the invention consists of a hook formed on a guide wall for the release lever at the front center of one of the two casings and a slot formed in the other casing and adapted to engage the hook.

Such a hook is formed on a rib provided on a part of an overlap part (where the upper and lower casings are overlapped) of the release lever guide wall at the front center of one of the casings.

In another embodiment the rib is reinforced with a structure U-shaped in cross section, and the hook is engaged with a slot formed in an overlap part of the other casing.

In still another embodiment the hook is formed on a rib provided on a part of an overlap part of the release lever guide wall at the front center of one casing, and desirably the lower part of the rib is integrally connected at least partly with adjacent overlap parts on both sides. The structure adds strength to the rib.

In these embodiments the hook may be formed at a point below and distant from the upper edge of the rib. This enables the rib part from the hook to the upper edge of the casing to serve as a guide at the time of assembling. Alternatively, in these embodiments it is possible to provide the hook at the upper edge of the rib and increase the height of the overlap parts of adjacent tabs on both sides of the rib. In this arrangement the upper edge parts of the overlap parts can serve as a guide for assembling work.

Yet another embodiment dispenses with the hook of the foregoing embodiments. It is possible instead to provide a solid joint part consisting of a vertical pair of posts, a male post and a cylindrical female post, in the upper and lower casings and in the vicinity of a release lever-controlling spring member so as to be forcibly fitted together.

A further embodiment uses a solid joint part consisting of integrally fusible ribs formed in the vicinity of the housing space where the brake members are contained, along the wall where the upper and lower casings are mated and joined together.

BRIEF EXPLANATION OF THE DRAWINGS

FIG. 5 shows the upper casing according to the invention, FIG. 5(a) being a plan view and (b), a front view;

FIG. 9 shows a conventional upper casing, FIG. 9(a) being a plan view and (b), a front view;

FIG. 18 shows the entire casing of the embodiment illustrated in FIG. 15; (a) being a plan view and (b), a front view;

FIG. 19 shows an embodiment of an upper casing having a slot and adapted to be combined with any of the lower casings in FIGS. 11 to 16 having a hook engageable with the slot; (a) being a front view and (b), a bottom view.

DETAILED DESCRIPTION OF THE PREFERRED EMBODIMENTS

Figure 1:
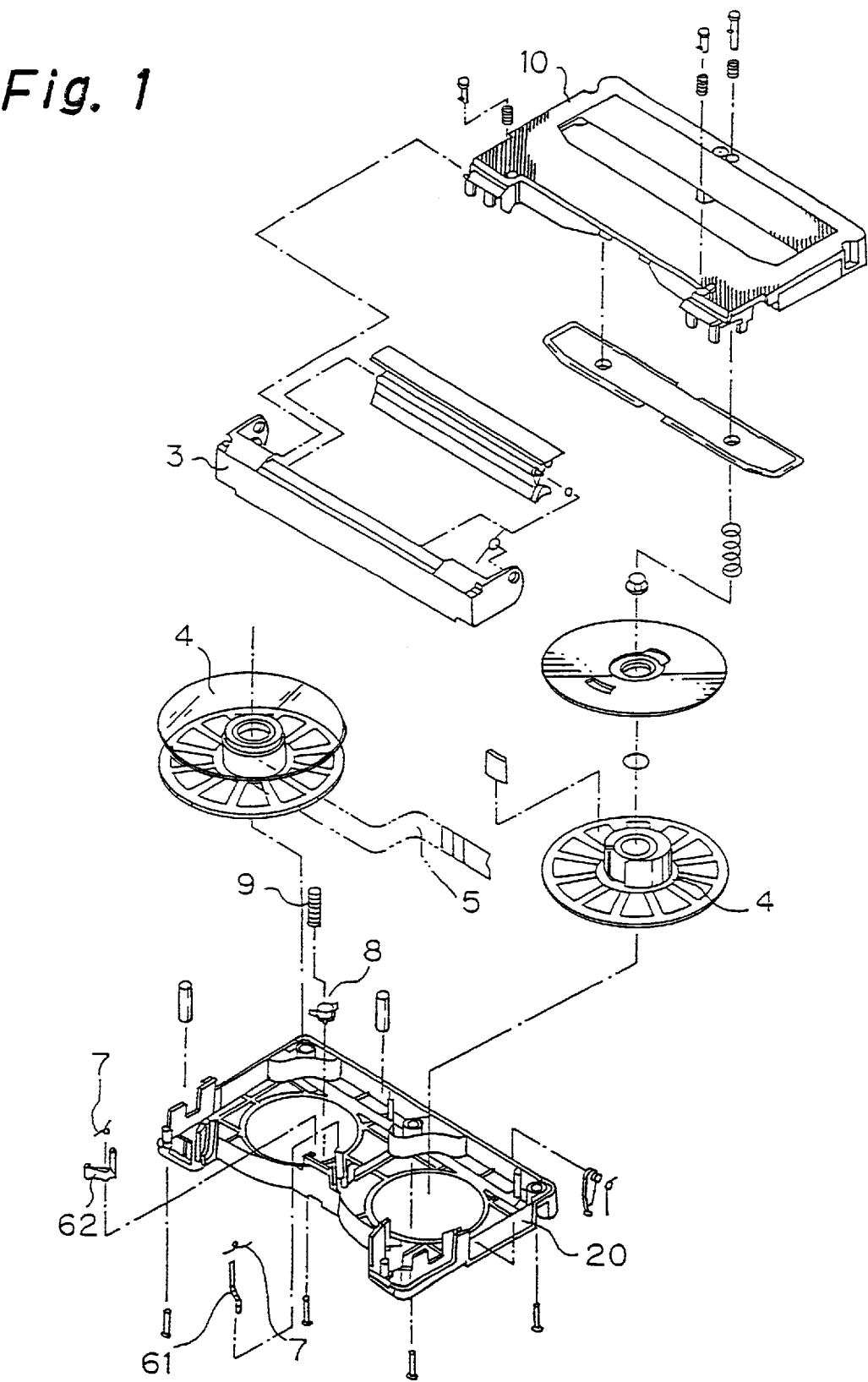
FIG. 1 is an exploded view of a tape cassette according to the present invention.

The present invention will now be more fully described below with reference to the accompanying drawings showing an embodiment thereof. Of the drawings, FIGS. 1 through 7 show the front wall parts of upper and lower casings and a cassette housing containing brake members in an embodiment of the invention. Parts not related to the essential parts are not specially explained in the drawings other than in FIG. 1.

The general construction of the tape cassette according to the invention is illustrated in FIG. 1. As shown, the tape cassette is comprised of two halves, upper casing 10 and lower casing 20, of plastics containing a pair of turnable reels 4, 4 around which a length of tape 5 is wound, and is provided with reel brakes 61, 62 that control the turning of the reels 4 in the front center part of the cassette housing, the brakes being forced by spring members 7 in mesh with serrated flange peripheries of the reels 4 so as to keep the reels from turning. The reel brakes 61, 62 are operatively connected with a release member 8 to swing as the latter moves up and down.

Figure 2:
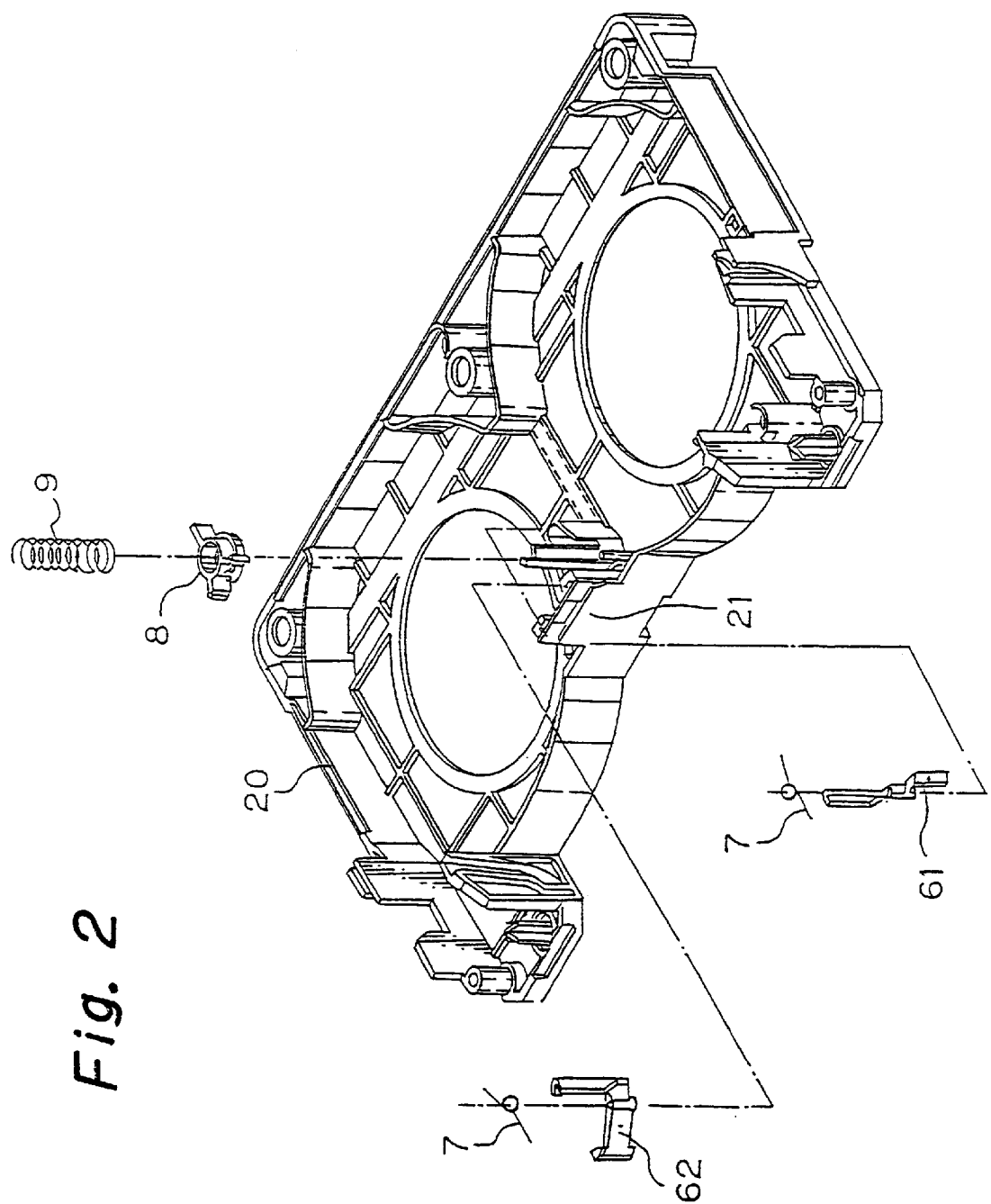
FIG. 2 is an exploded view of a lower casing and brake members of the cassette according to the invention.
Figure 3:
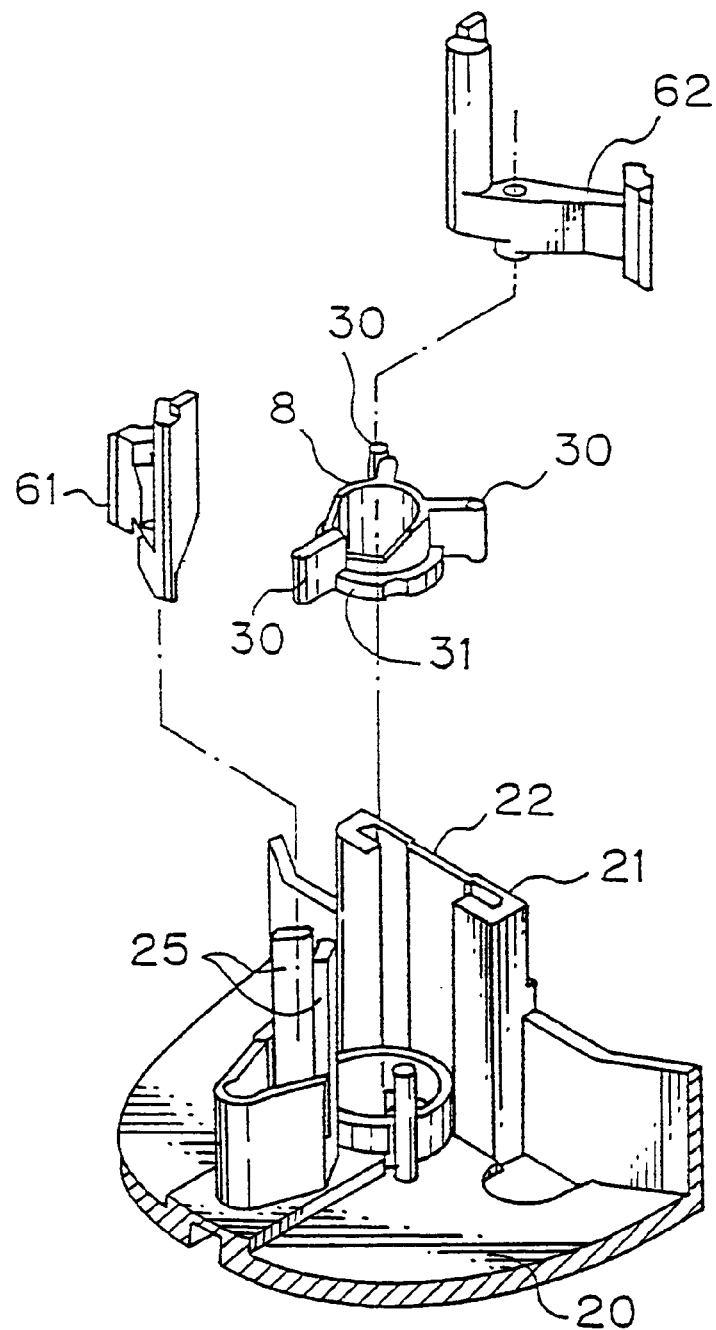
FIG. 3 is a perspective view of the brake members and surrounding part as viewed from the inside of the casing of FIG. 2.

FIG. 2 is an enlarged view of the lower casing 20 and a reel brake mechanism that comprises the reel brakes 61, 62 and release member 8. The release member 8 is normally pressed downward by a coiled spring 9 which abuts at the opposite end on the inner wall of the upper casing. By virtue of the spring tension the release member keeps the reel brakes 61, 62 in mesh with the serrations of the reels against the urging of the spring members 7. In the front wall of the lower casing 20 is formed a guide wall 21 in accordance with the invention to guide the release member 8. FIG. 3 is an enlarged perspective view of the reel brake mechanism as seen from the inside toward the front of the cassette housing. It shows the guide wall 21 according to the invention extending upwardly to fit in the upper casing, with an inward reinforcement projection 22 formed along the wall. The release member 8 has guided lugs 30, 30, 30 and brake pressers 31, and the guided lugs are vertically slidable in guide grooves formed in the guide wall 21 and between guide ribs 25 formed in the lower casing 20.

Figures 4A, 4B:
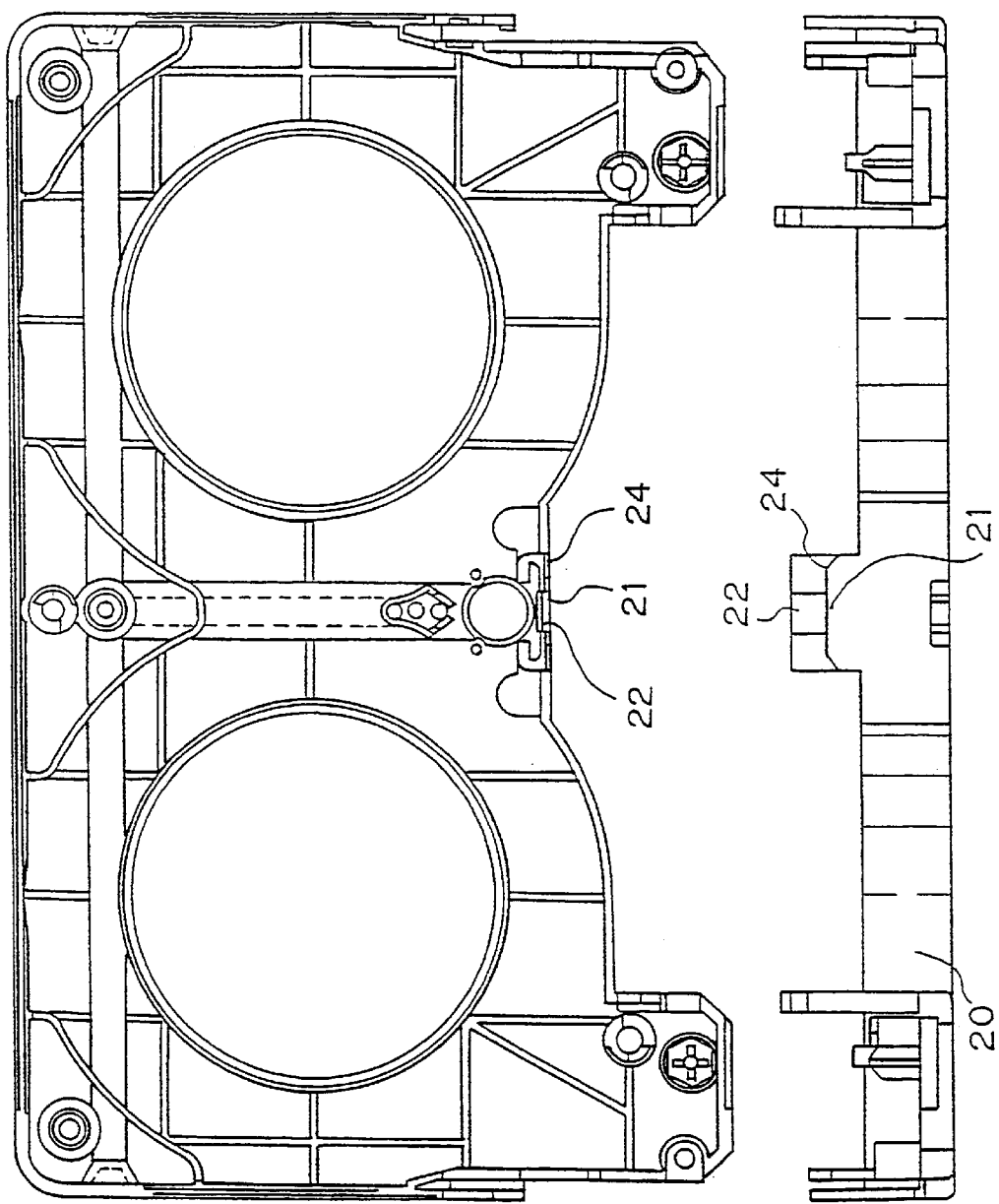
FIG. 4 shows the lower casing according to the invention, FIG. 4(a) being a plan view and (b), a front view.

FIG. 4 shows the lower casing and FIG. 5, the upper casing. The upper part 22 of the guide wall 21 of the lower casing 20 shown in FIG. 4 is rearwardly recessed and thin-walled at the front, and the front wall of the upper casing 10 shown in FIG. 5 has a thin-walled frontwardly recessing wall 11 formed in the corresponding part.

Figure 6A:
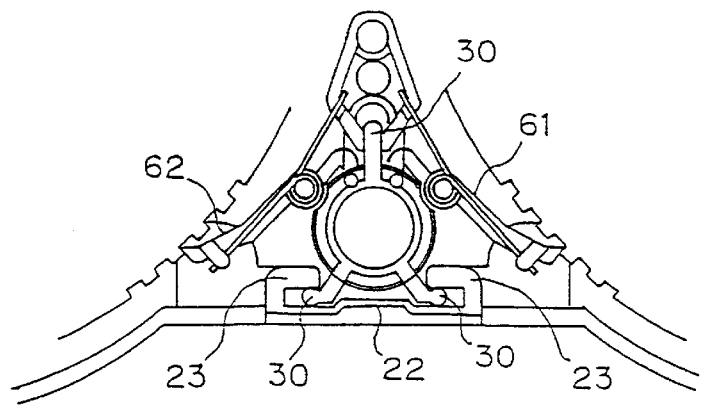
FIG. 6 shows essential parts according to the invention (when the brakes are at work), FIG. 6(a) being a plan view, (b) a front view with the front wall broken away, and (c) a fragmentary sectional view, partly in section.
Figure 6B:
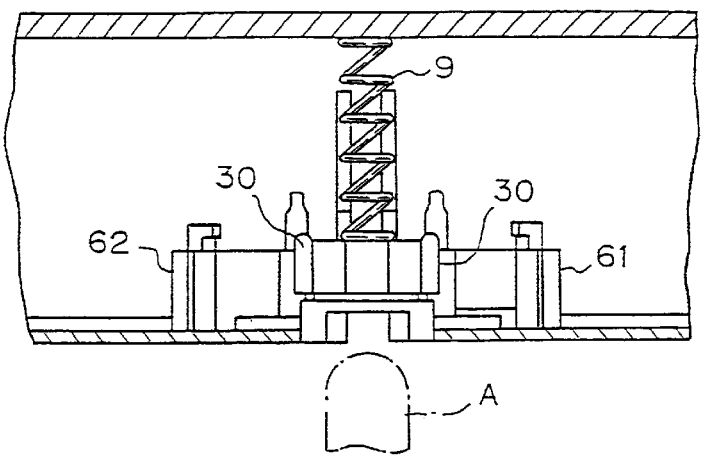
Figure 6C:
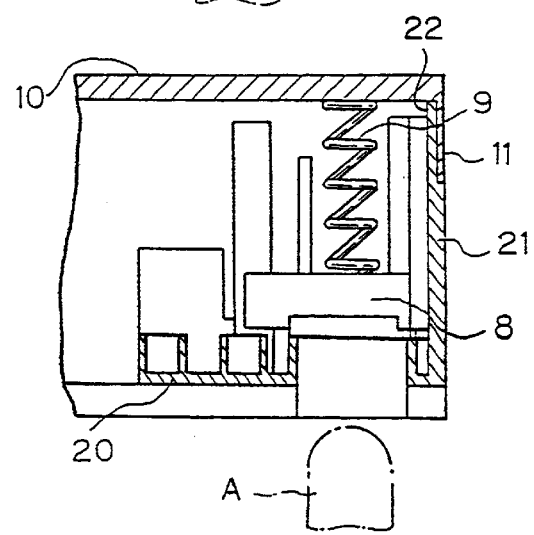

FIG. 6 shows, in section, the brake assembly when the cassette is not in use. The release member 8 is pressed downward by the coiled spring 9. It is provided with a pair of guided lugs 30 at the front, which enter L-shaped grooves 23 formed in the guide wall 21 of the lower casing 20 and are smoothly movable upward and downward, as is the other guided lug 30 formed at the rear between the guide ribs 25, 25 of the lower casing 20.

Figure 7A:
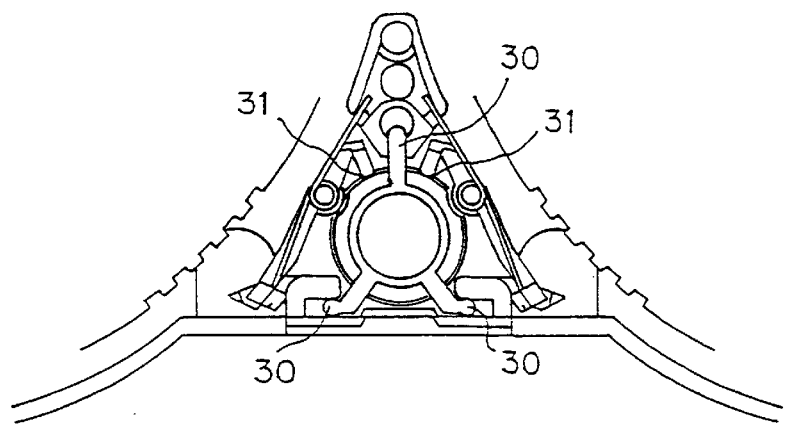
FIG. 7 shows essential parts according to the invention (when the brakes are released), FIG. 7(a) being a plan view, (b) a front view with the front wall broken away, and (c) a fragmentary sectional view, partly in section.
Figure 7B:
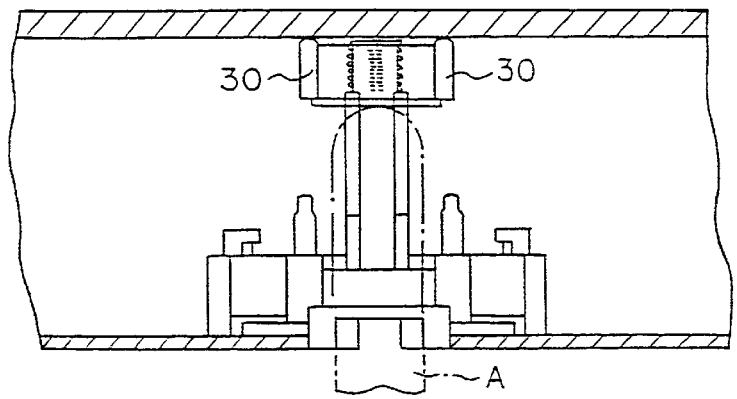
Figure 7C:
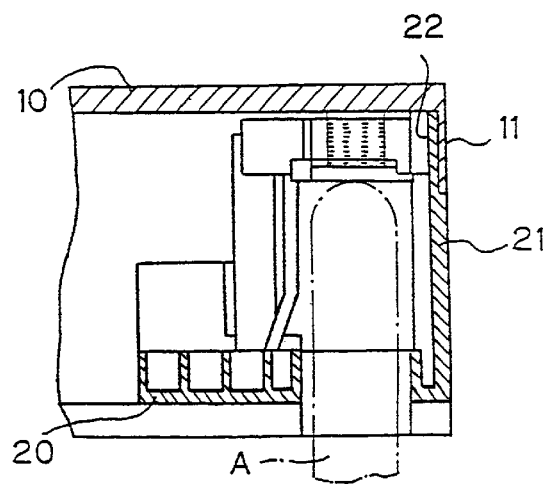
Figures 8A, 8B:
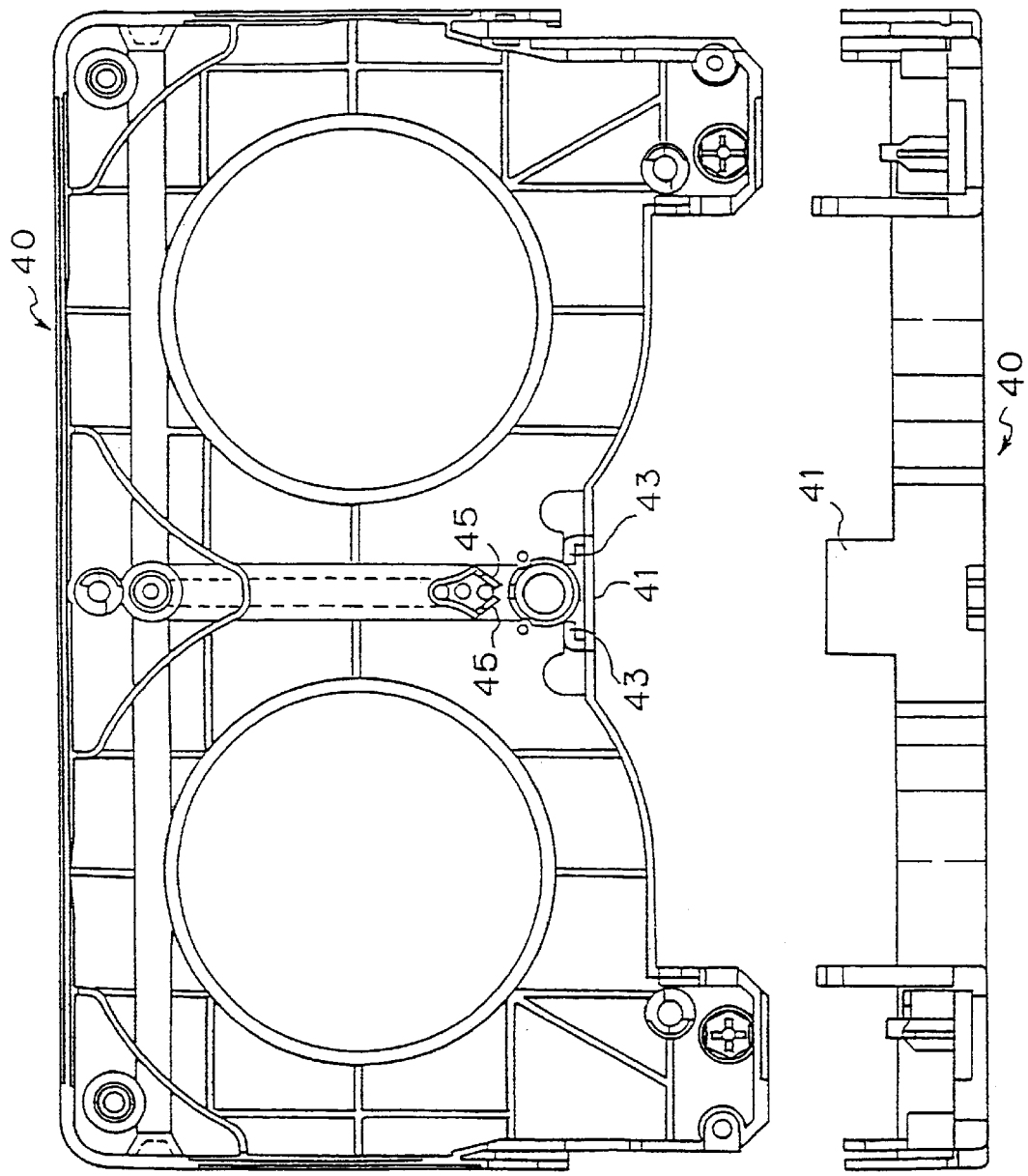
FIG. 8 shows a conventional lower casing, FIG. 8(a) being a plan view and (b), a front view.

FIG. 7 shows, in section, the brake assembly of the cassette when loaded in a videotape recorder. A brake release pin A of the VTR enters the cassette housing through an opening at the bottom of the lower casing 20 and forces the release member 8 upward. The brake pressers 31 formed on the opposite side of the guided lugs 30 of the release member 8 now allow the brake members 61, 62 to swing out of mesh with the serrations of the reels 4, setting the reels 4 free to turn.

As can be seen from FIGS. 6(*c*) and 7(*c*), the front center part of the cassette housing where the release member 8 is located is built so that the frontwardly recessed wall 11 of the upper casing 10 overlies and overlaps with the upper part 22 of the guide wall 21 of the lower casing 20 to provide a flush front wall surface.

Thus the release member 8 is always guided along the guide wall 21 of the lower casing 20 for smooth movement while the upper casing 10 is reinforced with the side wall 11 formed as a downward extension. Beveling the both corners of the recessed wall 11 of the upper casing 10 as at 12 (as is shown in FIG. 5) adds more strength. While the beveled corners are shown to be straight, they may be curved alternatively.

In conformity with the above configurations, the lower casing 20 is likewise beveled at 24.

The height of the recessed wall 11 of the upper casing 10 desirably accounts for 30 to 70% of that of the surrounding wall (equivalent to a half of the overall thickness of the cassette). If the height is less than 30% the upper casing 10 fails to secure adequate strength. Conversely if it is more than 70% the thin-walled guide wall part of the lower casing 20 becomes so tall that the strength of the lower casing 20 and the strength of the mold to form that part are unfavorably affected. The part defined between the L-shaped walls 23 of the guide wall 21 of the lower casing 20 leaves a space when the release member 8 is fitted in that region. Provision of the inward projection 22 from the guide wall minimizes the loss of strength and moldability of that part.

In the tape cassette of the invention, the wall for guiding the release member 8 is formed in one casing as before, and ensures good release action. The upper part of the guide wall for the release member 8 is composed of overlapping wall parts of the upper and lower casings. Since the upper casing is not cut off deep, the strength and heat resistance of the upper casing are kept unimpaired.

Other embodiments of the invention will be detailed below.

Figure 10:
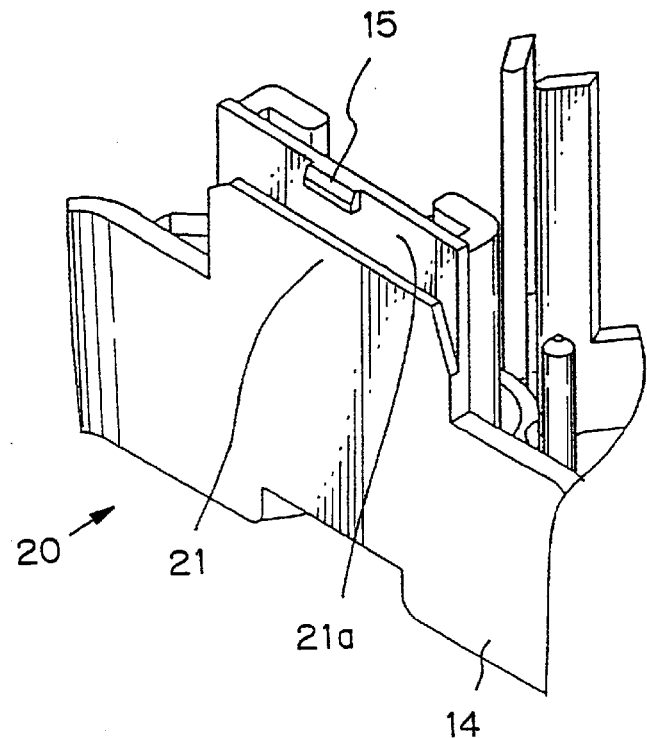
FIG. 10 is a fragmentary perspective view of a lower casing having a hook formed on the part of brake guide wall where the upper and lower casings overlap.

FIG. 10 illustrates another embodiment of the invention.

A guide wall 21 is provided in the center of the front wall 14 of the lower casing 20, and a hook 15 is formed on the upper part 21*a* of the guide wall 21 that is to overlap a corresponding part of the upper casing 10. Accordingly, as shown in FIG. 19(*a*), the corresponding part of the upper casing 1 that is to overlap the part of the lower casing 20 has a slot 16 for engagement with the hook when the upper and lower casings 10, 20 are joined to form a housing.

With the embodiment shown in FIG. 10, mating the upper and lower casings 10, 20 for assembling deforms the front wall of the upper casing 10 by the amount of projection of the hook 15. In that case, because the engaging parts of the upper and lower casings 1, 2 (the hook 15 and the slot 16 of the upper and lower casings 10, 20, respectively) are made integral with the overlap part 21*a*, little flexibility is provided for the joining of the upper and lower casings; necessitating much power for fitting the casings together for assembling.

Figure 13:
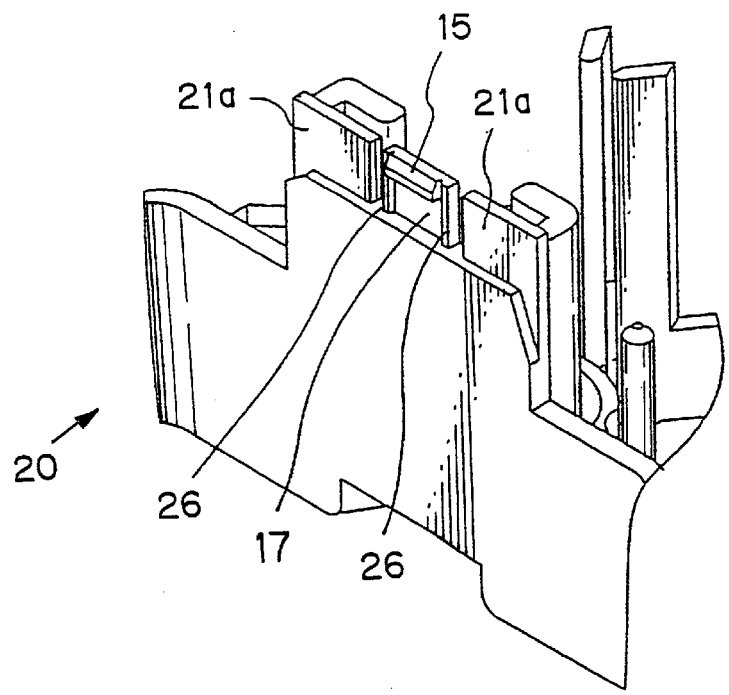
FIG. 13 is a fragmentary perspective view of a lower casing having a tab with a hook formed independently in the center of the brake guide wall part where the upper and lower casings overlap.
Figure 11:
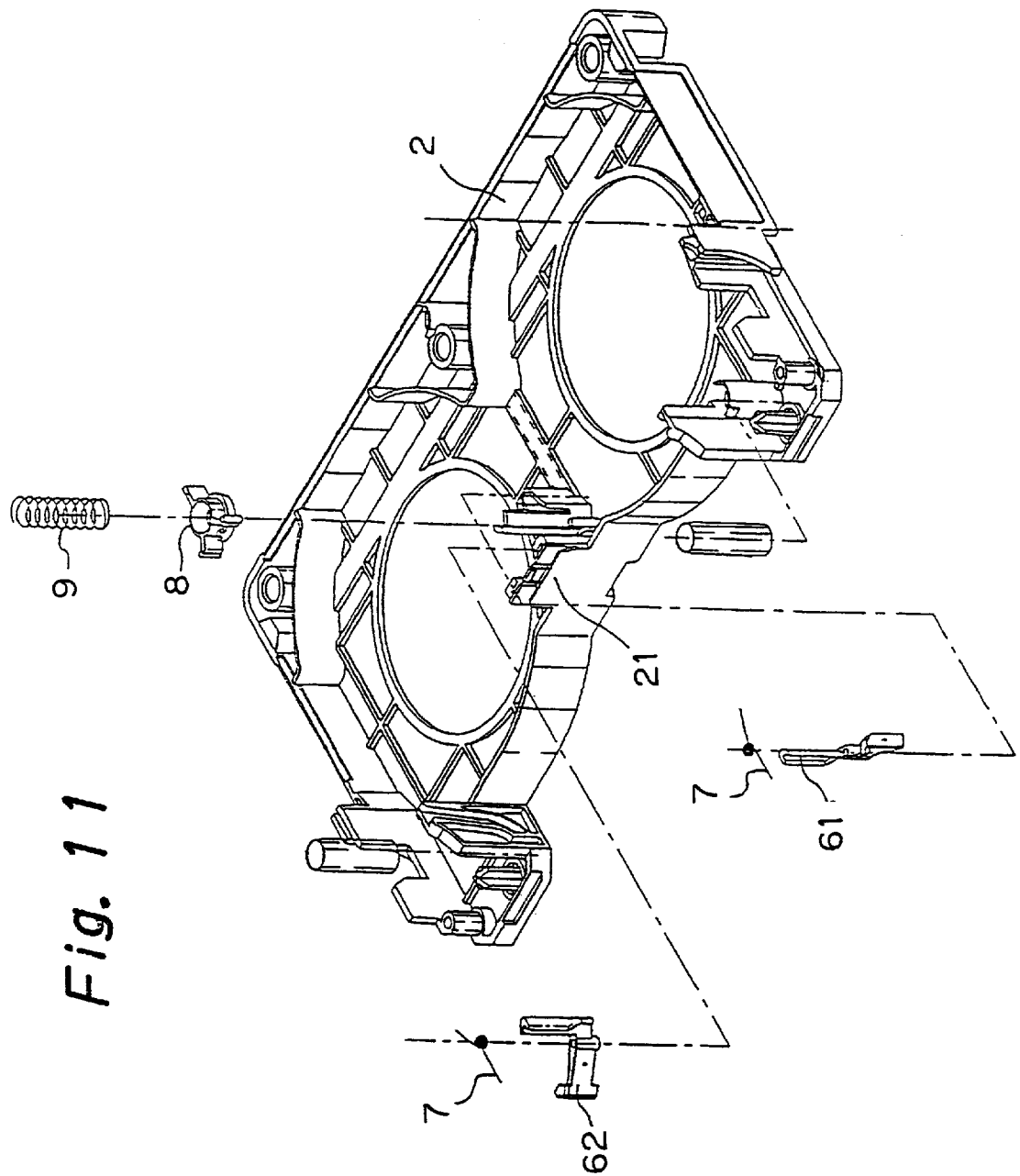
FIG. 11 is an exploded view of a lower casing and brake members of the cassette according to the invention.
Figure 12:
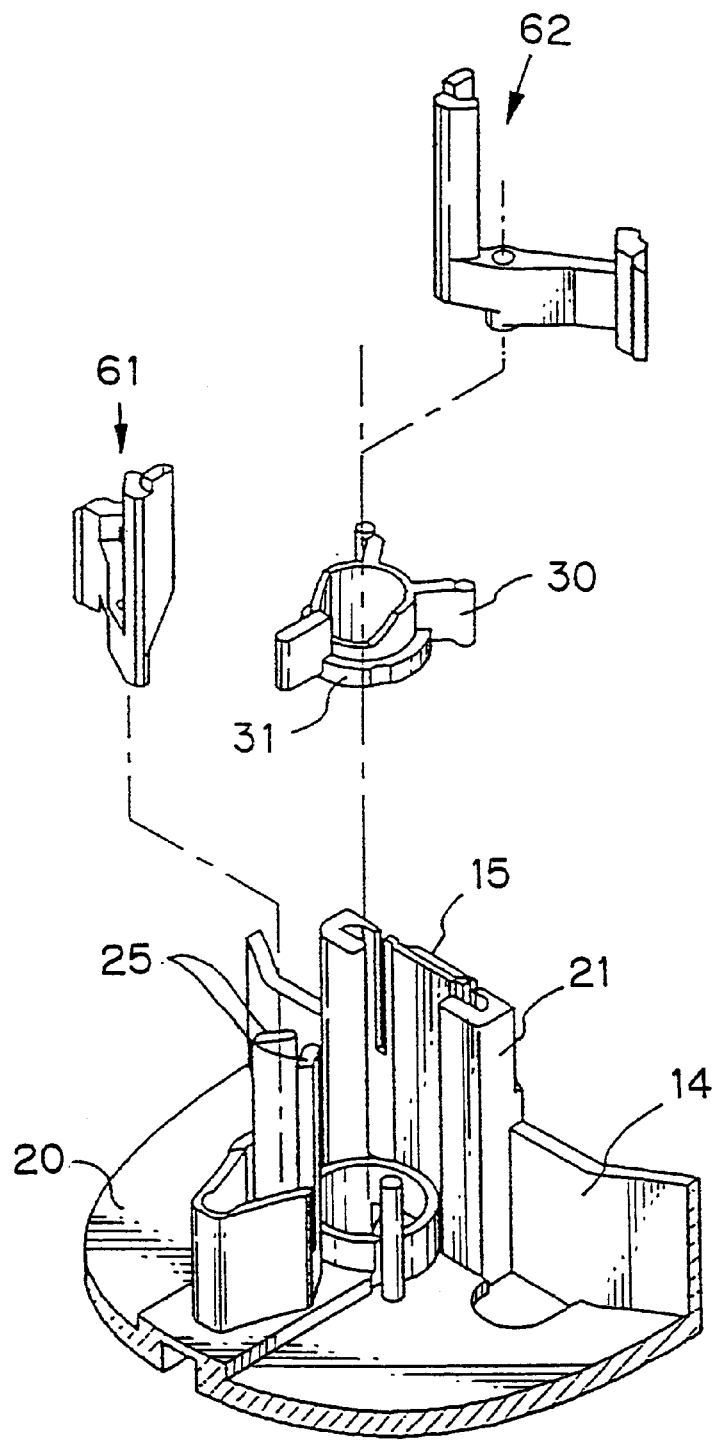
FIG. 12 is an enlarged perspective view of the brake members and surrounding parts as viewed from the inside of the casing of FIG. 11.

FIGS. 11, 12, 13 illustrate other embodiments of the invention, which are improvements over the first embodiment in the respect above pointed out. A hook 15 is formed on a central rib 17 independently of adjacent overlap parts 21*a*. The rib 17 bends as the upper and lower casings 10, 20 are assembled and makes the assembling work easier. Since the rib 17 itself requires a certain degree of strength, perpendicular ridges 26 are formed on both edges of the rib 17, which are combined with the hook to form projections in a generally U-shaped pattern for reinforcement.

Figure 14:
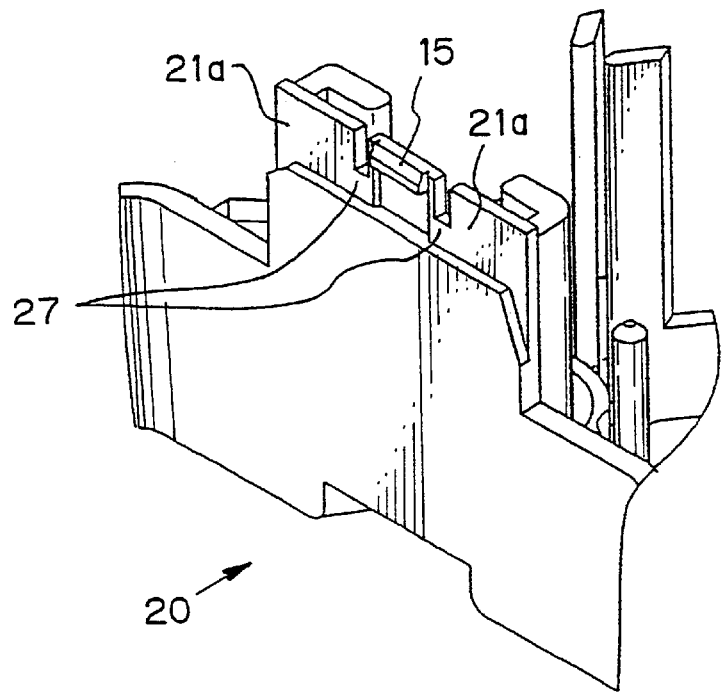
FIG. 14 is a fragmentary perspective view of a lower casing having a tab with a hook formed in the center of the brake guide wall part where the upper and lower casings overlap.

FIG. 14 depicts an alternative to the embodiment shown in FIG. 13. In place of the ridges 26 provided in FIG. 13, the both sides of the rib 17 are connected in one piece with the overlap parts 21*a* through lower wall parts 27, whereby strength and elasticity are imparted to the rib 17.

Figure 15:
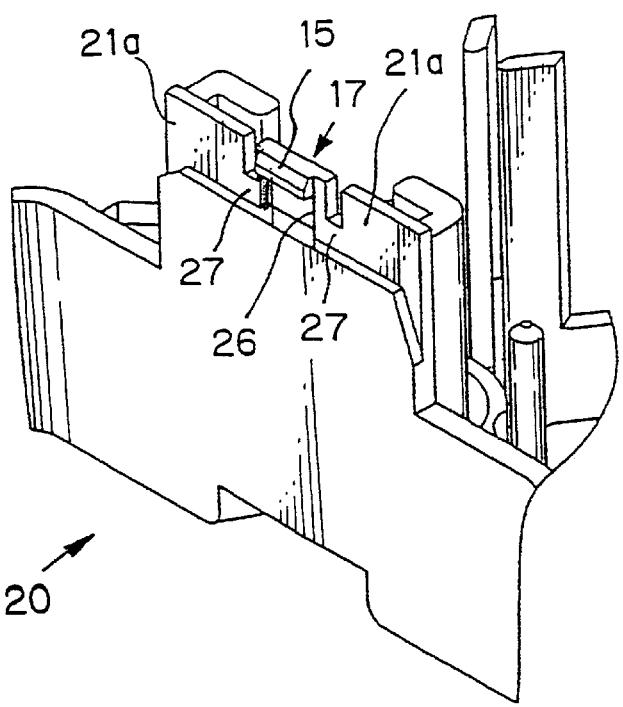
FIG. 15 is a fragmentary perspective view of a lower casing incorporating the both features of FIGS. 13 and 14.

What is shown in FIG. 15 is a combination of the embodiments in FIGS. 10 and 13. The rib 17 is formed with ridges 26 in a letter-U formation with the hook, which coacts with integral lower connecting parts 27 to give strength and elasticity to the rib 17.

Figure 16:
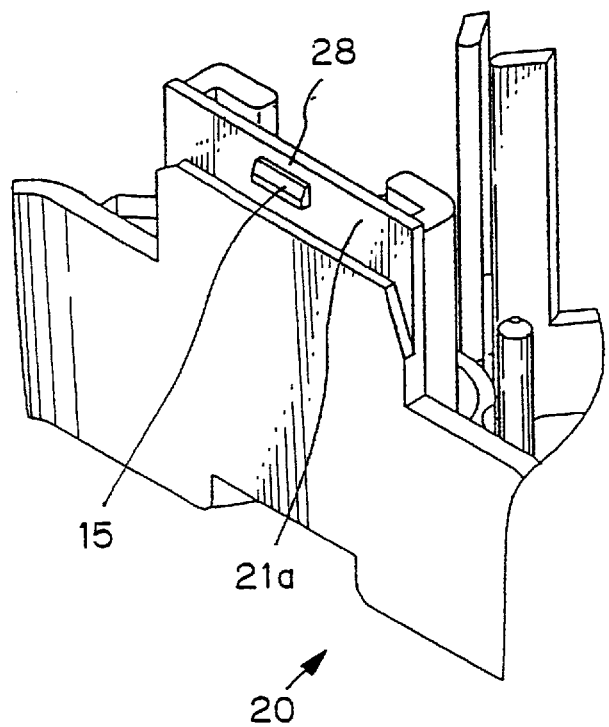
FIG. 16 is a fragmentary perspective view similar to FIG. 10 but improved in respect of the hook position.

The hook 15 in FIG. 10 may be displaced to a position shown in FIG. 16, that is, from the upper end of the overlap part 21*a* to a slightly lower position at a distance 28 from the upper end. When the upper and lower casings 10, 20 are to be joined together, the part of the distance 28 serves as a guide to facilitate the assembling.

The effect similar to that which is attained with the embodiment of FIG. 16 can also be achieved by decreasing the height of the rib 17 in the embodiments of FIGS. 13 to 15, compared to the height of the adjacent overlap parts 21*a*.

The embodiments so far described use a hook 15 in common. The hook enables the cassette to be disassembled, when it is necessary to add some forgotten parts or replace wrong parts, simply by pulling off the screws 13 at the four corners of the housing, and to be reassembled with ease.

In these embodiments the lower casing having a hook 15 is used in combination with an upper casing 10 formed with a hook-receiving slot 16 shown in FIG. 19 that was referred to in connection with the cassette of the embodiment illustrated in FIG. 10.

Figure 17:
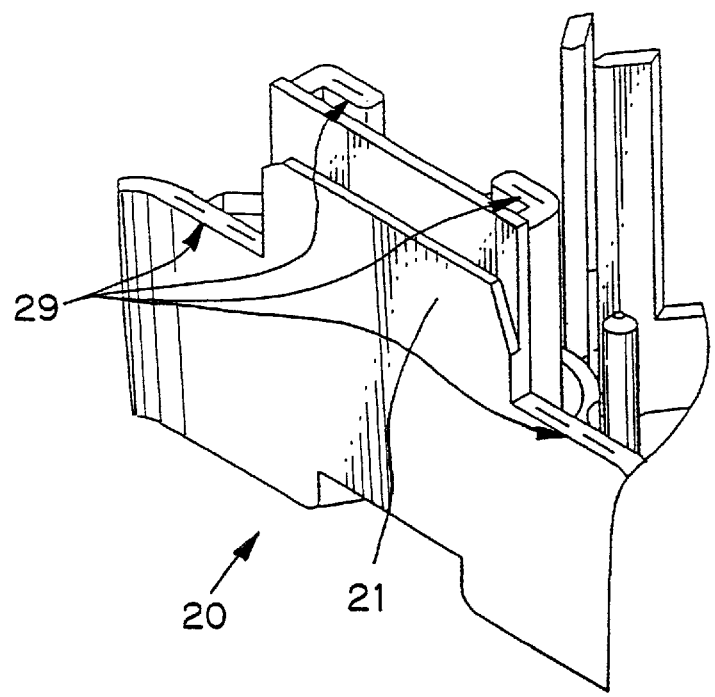
FIG. 17 is a fragmentary perspective view showing the parts to be joined as integrally fusible parts.

In FIG. 17 is shown an embodiment provided with integrally fusible ribs 29 in the vicinity of guide wall 21 of a lower casing 20. Although the cassette cannot be disassembled like the embodiments having a hook 15, this design is superior in that the upper and lower casings can be hermetically joined together around the brake mechanism.

Figure 20:
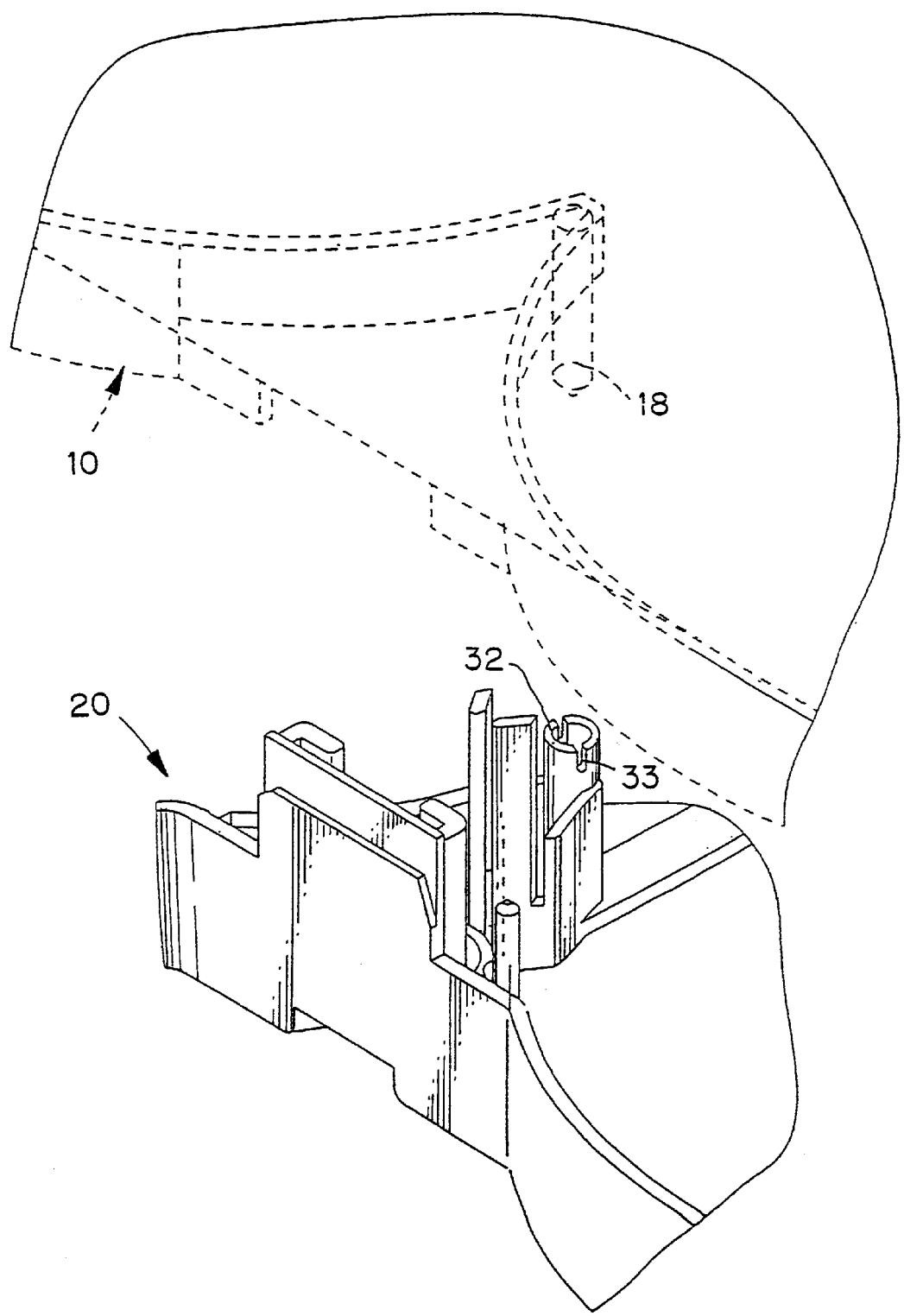
FIG. 20 is a fragmentary perspective view of upper and lower casings having an engageable pair of male and female posts for solid joining.

FIG. 20 shows a male post 18 provided in an upper casing 10 and a cylindrical female post 32 in a lower casing 20 for engagement with the post 18 close to the region where brake members 61, 61 and other related parts are located inside the housing. The cylindrical female post 32 has slits 33 for the facility of engagement. These posts 18, 32 are forcibly fitted together when the casings are joined together. The male and female contours of the posts may be reversed when desired. The connector means of this design facilitates disassembling of the cassette housing, and the outward appearance is not marred as by a slot that is required when a hook is to be provided.

In either case the post means allow the upper and lower casings to be securely united, especially in the front center, thus ensuring excellent heat resistance and shelf life with no possibility of gap forming between the upper and lower casings.

The present invention provides a tape cassette of the type wherein reel brakes are released by a release pin, having means for solidly joining the upper and lower casings of the cassette in the vicinity of a spring member that controls the upward and downward movement of the release lever. Consequently, the cassette in storage at elevated temperature does not develop any gap between the mating edges at the front center of the housing. Thus a heat-resistant, reliable cassette can be provided, with no possibility of the thickness of the cassette deviating from the specified or standard range.

What is claimed is:

1. A tape cassette including a housing comprised of upper and lower casings, a pair of tape reels around which a length of tape is wound and which is turnably held in the housing, brake members for controlling the turning of the reels, a brake release lever which is moved upward and downward by a release pin of a device when the tape cassette is loaded therein, and a spring member normally urging the release lever downward, said release lever being adapted to move upward and downward along the front wall of the housing to move the brake members accordingly, said upper and lower casings being joined together, wherein a solid joint part for securing the upper and lower casings together is provided in the vicinity of the region where the release lever moves upward and downward along the front wall, and wherein the solid joint part consists of a hook formed in the front wall part at the front center of one of the two casings and a slot formed in the other casing and adapted to engage the hook.

2. The tape cassette according to claim 1 wherein the hook is formed on a rib provided on the front wall at the front center of one of the casings and the rib is U-shaped in cross section.

3. The tape cassette according to claim 1 wherein the hook is formed on a rib provided on the front wall at the front center of one of the casings and the both sides of the rib are connected in one piece with adjacent parts.

4. The tape cassette according to claim 1 wherein the hook is formed at a point below and distant from the upper edge of the front wall.

5. A tape cassette including a housing comprised of upper and lower casings, a pair of tape reels turnably held in the housing, and a brake mechanism comprising reel brake members and a brake release member all of which are located in the front part of the housing and between the pair of tape reels, in an arrangement such that, when the cassette is not in use, said brake members are urged by a spring member in directions where they are in mesh with serrated flange peripheries of the reels and, when the cassette is used, said release member is forced upward against the spring force by a brake release pin and said brake members cooperatively swing out of mesh with said serrated flange peripheries of the reels, setting the tape reels free to turn, characterized in that a guide wall for guiding said release member for upward and downward movement is formed in one piece with the lower casing, with the upper part of the guide wall being overlapped with a corresponding part of the upper casing, wherein a solid joint part for securing the upper and lower casings together is provided in the vicinity of the region where the release lever moves upward and downward along the front wall and wherein the solid joint part consists of a hook formed in the front wall part at the front center of one of the two casings and a slot formed in the other casing and adapted to engage the hook.

6. The tape cassette according to claim 5 wherein the hook is formed on a rib provided on the front wall at the front center of one of the casings and the rib is U-shaped in cross section.

7. The tape cassette according to claim 5 wherein the hook is formed on a rib provided on the front wall at the front center of one of the casings and the both sides of the rib are connected in one piece with adjacent parts.

8. The tape cassette according to claim 5 wherein the hook is formed at a point below and distant from the upper edge of the front wall.

* * * * *